(12) United States Patent
Lavie

(10) Patent No.: US 11,792,363 B2
(45) Date of Patent: Oct. 17, 2023

(54) TELECONFERENCING DEVICE

(71) Applicant: MYZEPPI LTD., Nahariyya (IL)

(72) Inventor: Eitan Lavie, Tel-Aviv (IL)

(73) Assignee: MYZEPPI LTD., Nahariyya (IL)

( * ) Notice: Subject to any disclaimer, the term of this patent is extended or adjusted under 35 U.S.C. 154(b) by 330 days.

(21) Appl. No.: 17/427,017

(22) PCT Filed: Feb. 3, 2020

(86) PCT No.: PCT/IL2020/050126
§ 371 (c)(1),
(2) Date: Jul. 29, 2021

(87) PCT Pub. No.: WO2020/161701
PCT Pub. Date: Aug. 13, 2020

(65) Prior Publication Data
US 2022/0131914 A1 Apr. 28, 2022

Related U.S. Application Data

(60) Provisional application No. 62/803,508, filed on Feb. 10, 2019.

(51) Int. Cl.
*H04N 7/14* (2006.01)
*H04L 65/403* (2022.01)
(Continued)

(52) U.S. Cl.
CPC ............ *H04N 7/142* (2013.01); *G03B 21/56* (2013.01); *G05D 1/0038* (2013.01); *G06T 7/20* (2013.01);
(Continued)

(58) Field of Classification Search
CPC .......... H04N 7/15; H04N 23/57; H04N 23/71; H04N 9/3141; H04N 7/142; H04N 7/147;
(Continued)

(56) References Cited

U.S. PATENT DOCUMENTS 9,661,272 B1 * 5/2017 Daniel ................ G03H 1/0005
9,854,206 B1 * 12/2017 Ren ........................ H04N 7/147
(Continued)

FOREIGN PATENT DOCUMENTS

| WO | WO2018070067 A1 | 4/2018 |
|----|-----------------|--------|
| WO | WO2018122830 A1 | 7/2018 |
| WO | WO2018136072 A1 | 7/2018 |

*Primary Examiner* — Quoc D Tran

(57) ABSTRACT

A teleconferencing device comprising: a propulsion system; a projection unit; at least one sensor capable of obtaining information enabling mapping an environment surrounding the teleconferencing device; and a processing unit, configured to: obtain information from the at least one sensor; map the environment surrounding the teleconferencing device, using the obtained information; track a position and an orientation of at least one user of the teleconferencing device with respect to the teleconferencing device; determine a desired position and orientation of a given part of a surface of the teleconferencing device with respect to the at least one user; activate the propulsion system to fly the teleconferencing device to the determined desired position and orientation; receive a stream of images captured by a remote device; and instruct the projection unit to project the received stream of images on the given part of the surface.

20 Claims, 13 Drawing Sheets

(51) Int. Cl.

| | | |
|---|---|---|
| *G06T 7/70* | (2017.01) | |
| *G03B 21/56* | (2006.01) | |
| *G05D 1/00* | (2006.01) | |
| *G06T 7/20* | (2017.01) | |
| *G10L 25/60* | (2013.01) | |
| *H04N 9/31* | (2006.01) | |
| *H04N 7/15* | (2006.01) | |
| *G06V 10/764* | (2022.01) | |
| *B64B 1/40* | (2006.01) | |
| *G03B 29/00* | (2021.01) | |
| *G06T 7/00* | (2017.01) | |
| *H04R 1/02* | (2006.01) | |
| *H04R 3/00* | (2006.01) | |
| *H04N 23/71* | (2023.01) | |

(52) U.S. Cl.
CPC ............... *G06T 7/70* (2017.01); *G10L 25/60* (2013.01); *H04L 65/403* (2013.01); *H04N 7/15* (2013.01); *H04N 9/3141* (2013.01); *B64B 1/40* (2013.01); *G03B 29/00* (2013.01); *G06T 7/0002* (2013.01); *G06T 2207/10032* (2013.01); *G06T 2207/30168* (2013.01); *G06T 2207/30196* (2013.01); *G06V 10/764* (2022.01); *H04N 23/71* (2023.01); *H04R 1/028* (2013.01); *H04R 3/00* (2013.01)

(58) Field of Classification Search
CPC ....... G06F 11/263; B64B 1/40; H04L 65/403; G03B 17/54; G03B 21/00; G03B 21/145; G03B 21/56; G03B 29/00
See application file for complete search history.

(56) References Cited

U.S. PATENT DOCUMENTS

| | | | |
|---|---|---|---|
| 9,891,885 | B2 | 2/2018 | Kim |
| 10,701,310 | B2 * | 6/2020 | Pandey ............... H04L 65/1016 |
| 11,434,002 | B1 * | 9/2022 | Intriligator ............ H04N 7/185 |
| 2005/0219479 | A1 | 10/2005 | Mugrauer |
| 2006/0119701 | A1 | 6/2006 | King |
| 2011/0292348 | A1 | 12/2011 | Shigeaki |
| 2015/0092020 | A1 | 4/2015 | Vaughn |
| 2015/0208036 | A1 * | 7/2015 | Wu ..................... H04N 13/194 |
| | | | 348/14.09 |
| 2016/0227168 | A1 | 8/2016 | Vendrow |
| 2017/0029098 | A1 | 2/2017 | Sopper et al. |
| 2018/0131901 | A1 | 5/2018 | Tobita |
| 2022/0026736 | A1 * | 1/2022 | Miller ................... H04N 13/32 |

* cited by examiner

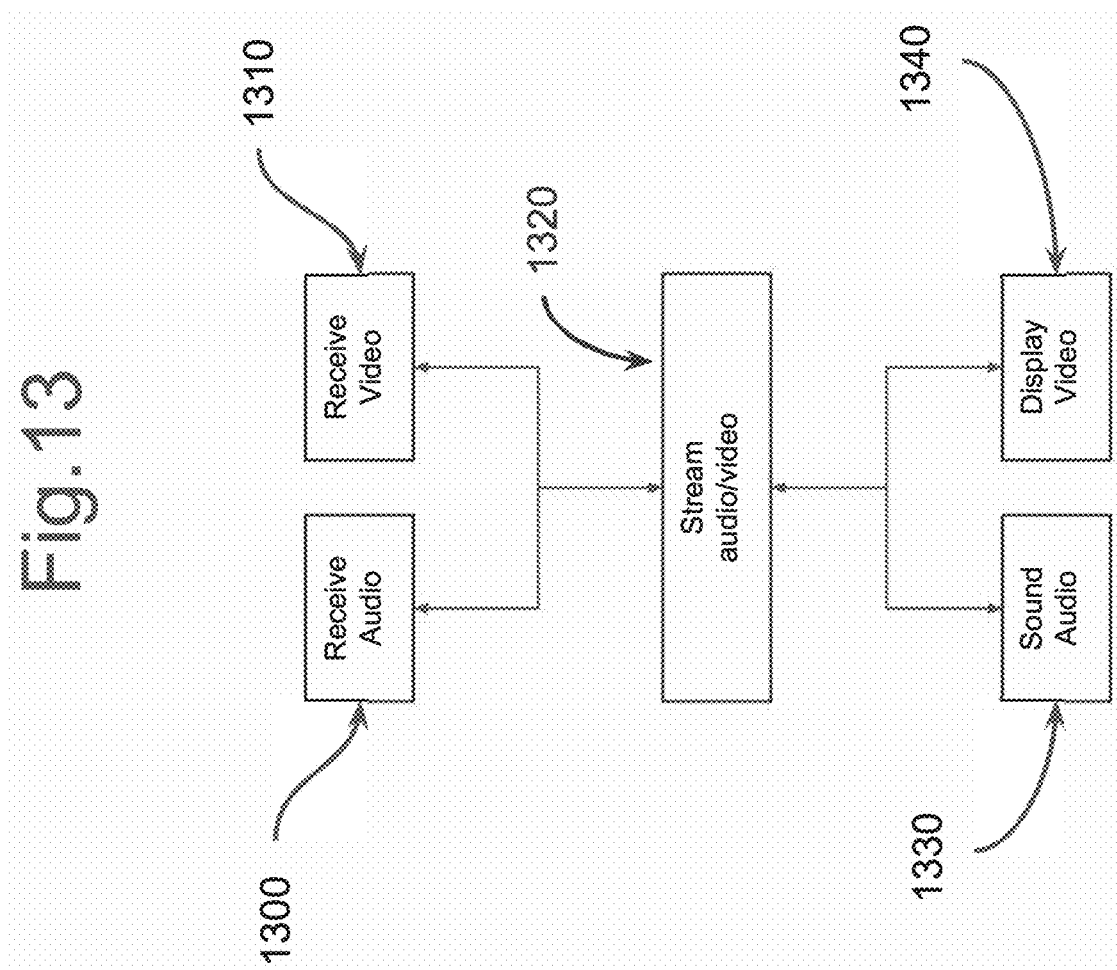

TELECONFERENCING DEVICE

TECHNICAL FIELD

Exemplary embodiments of the presently disclosed subject matter relate to a video call device, and more particularly, to a flying video call device.

BACKGROUND

When two or more people have a face to face conversation, they will naturally move themselves to a specific position and orientation in response to the position and orientation of the other people. They will also move according to the other people's behavior and according to different environmental factors. For example, two people will select a specific comfortable distance of one to two meters between each other for a conversation and would directly face each other. If a third person joins the conversation, they would increase their direct distance between each other by an additional half meter and change their orientation to create a circle. If there is background noise, they would reduce the distance between each other and increase the voice volume. If one person was blinded by strong lighting, the others would change their position to distance themselves from the light source vector. If one person would sit down the rest would naturally attempt to sit down as well. If there's a large flower vase on a table, the people would select seats the provided them with a clear line of sight between each other. If two people are having a conversation while one person is washing the dishes, the natural position for the second person would be a meter and a half away and alongside the countertop.

Current video call devices simply fail to take such factors into consideration, which results in poor dynamic positioning of the video call device with respect to the users during a video call forcing users to adopt a different and limiting position and behavior accordingly.

There is thus a need in the art for a new method and system for two or more people to be able to hold a remote video call which would be able to mimic the human behavior according to the relative location of the other people in the call, the people's behavior and environmental factors.

References considered to be relevant as background to the presently disclosed subject matter are listed below. Acknowledgement of the references herein is not to be inferred as meaning that these are in any way relevant to the patentability of the presently disclosed subject matter.

Flying display device. U.S. Pat. No. 9,891,885 (Beomshik), published on Feb. 13, 2018, discloses a display device includes a display unit, at least a flight unit connected to the display unit, a position information receiving unit obtaining information on a current position of the display device, a sensor unit obtaining information of a user, a flight control unit automatically controlling a flight of the display device, a posture information obtaining unit obtaining posture information of the display device, a main control unit controlling an overall operation of respective components of the display device, a posture correction unit varying an angle of the display device or the display unit, a vibration system, a voice recognition unit, a communication module, an input member transmitting input information to the communication module, a power source unit, an obstacle detection unit, a joint manipulator connecting the at least one flight unit and the display unit, and a connector connecting the display unit and the display device.

Balloon and balloon control method. US Patent No. 20110292348 (Hiroaki), published on Dec. 1, 2011, discloses a balloon including an envelope and a projecting unit that projects an image, which switches display mode between first display mode that displays the image projected by the projecting unit on the envelope and second display mode that displays the image projected by the projecting unit on an external object through the envelope.

High endurance unmanned aerial vehicle. WIPO Patent No. 2018122830 (Jayant), published Feb. 28, 2018, discloses an overall efficiency and/or flight time of UAVs and Drones can be increased by adding elements containing lighter-than-air gasses; and/or by reducing and/or eliminating the power supplied to any combination of the motors to reduce overall power consumption. In an aspect the configuration of a blimp drone comprises at least one air cavity/chamber/container filled with lighter-than-air gasses. The 3D chambers are made from swept or extruded closed 2D geometry and are detachable from the Drone and can be transparent or camouflaged in color. To maintain control and altitude of the aircraft, lifting surfaces can be incorporated. Such lifting surfaces may include active and/or passive control surfaces to maintain flight stability. Additionally, cavities, fissures, orifices and valves may be added to the surface of the flying vehicle to gain other efficiency advantages.

Ambulatory system to communicate visual projections. US Patent No. 20150092020 (Vaughn) Apr. 2, 2015, discloses an ambulatory system to communicate visual projections. An embodiment of an apparatus for ambulatory communication includes: a propulsion system to enable the apparatus to fly, including to hover in place and to follow a user; a stereo camera to record an image of a user of the apparatus or a scene nearby the user of the apparatus; a transmitter to transmit video data generated by the stereo camera to a second apparatus via network for a communication with a remote user; a receiver to receive video data via the network from the remote user; and a video projection mechanism to project an image including the received video to the user.

System and method for dynamically selecting networked cameras in a video conference. US Patent No. 20160227168 (Vendrow), Aug. 4, 2016 discloses systems and methods provided for dynamically selecting one or more networked cameras for providing real-time camera feeds to a video conference. The systems and methods may include identifying one or more networked cameras associated with an area of a conference participant. A server may analyze real-time camera feeds from the identified cameras, and select a video feed having a view of the participant. The server may provide the selected feed to the video conference via a conference bridge, and continue monitoring camera feeds of cameras associated with the participant's area for another camera feed having a better view of the participant. Networked cameras may include fixed and mobile cameras owned and operated by individuals that are not associated with the participant, but who have registered their cameras with the server for use in video conferences.

Information processing device, information processing method, and terminal device. US Patent No. 20180131901 (Tobita), May 10, 2018 discloses an information processing device, including: a camera that captures a real space; a communication unit that communicates with a terminal device used by a remote user; a streaming control unit that streams a first video captured by the camera from the communication unit to the terminal device if the information processing device itself is selected by the remote user from among a plurality of devices that capture the real space; and a display that displays a user image of the remote user while the first video is being streamed to the terminal device.

Unmanned Aerial Vehicles for Collaboration. US Patent No. 20170029098, (Clark), Feb. 2, 2017 discloses a mobile telepresence system may include a frame, a propulsion system operably coupled to the frame to propel the frame through a designated space, a screen movably coupled to the frame, and an image output device coupled to the frame. The frame may include a central body defining a longitudinal axis of the frame, a first arm at a first end portion of the central body, and a second arm at a second end portion of the central body, opposite the first end portion of the central body. The propulsion system may include rotors at opposite end portions of the first and second arms which propel the frame in response to an external command. The image output device may project an image onto the screen in response to an external command.

Telepresence. WIPO Patent No. 2018136072 (Bortolini), Jul. 26, 2018, discloses some examples include a telepresence system including a mobile location device and a head mounted display assembly to visualize an image representing a first user within a second user's environmental surroundings based on orientation toward the mobile location device. The head mounted display assembly communicates with a video conferencing device via a wireless communication system.

There is thus a need in the art for a new video call device which, inter alia, would be able to autonomously update its position and orientation according to the local user's position, orientation, behavior and environmental factors for the purpose of generating a feeling for the local user that the remote user is present in the local environment and his presence adheres to the accepted cultural behavior in a face to face conversation.

SUMMARY OF INVENTION

With the common video call systems used to date, the camera and screen are either stationary and connected to different compute systems such as laptops or are a part of a mobile smartphone that needs to be manually held during the call. In some more advanced cases, screens and cameras are installed on top of ground moving robots which attempt to follow one user or accept control requests from a remote user. These solutions are not able to truly replicate the real-life experience of a face to face conversation between two or more people because the screen size is not big enough to display the real-life size of the remote user together with being able to dynamically move that screen in the same natural location and posture the remote user would have positioned himself had he been conversing face to face.

In order to evaluate and update the relative position, the system would need to be able to evaluate both the technical and the behavioral aspects a human evaluates during a conversation and act upon their identification.

It is to be noted that the terms Teleconferencing Device and Video Call Aerial Unit 300 are used interchangeably herein, the terms Projection Unit and Projector/Display 710 are used interchangeably herein, the terms Sensors and Cameras 700 are used interchangeable herein, the terms Machine Learning Classifier 1250 and Use Scenario Classifier are used interchangeably herein.

According to the present disclosure, there may be provided, for example, a system combined of optionally a gas filled balloon providing buoyancy together with, optionally, an electronics belt, for example, providing the required hardware and systems where the balloon may be easily replaced with a new one as required.

According to the present disclosure, there may be provided a compute, network, cameras, microphones, speakers and projection display to provide an endpoint for a video call with an additional similar endpoint or other type of endpoint available in the market.

According to the present disclosure, there may be provided sensors to obtain information that may be used to map the environment, lighting conditions, detect obstacles, track the users' physical and behavioral parameters in order to provide the required inputs for a computer system to analyze, compare and update its data repository and provide instructions to the propulsion system to update its position and orientation accordingly.

According to the present disclosure, there may be provided audio sensors to detect direct voice commands, detect user conversation words for a computer system to analyze, compare and update its data repository in order to identify if an update to the system position is required or a speaker volume change is required.

According to the present disclosure, there may be provided a set of air propulsion engines with a control system, accelerator sensors and positioning sensors and rechargeable battery which enable the unit to maintain and update its flying position according to the various inputs commands.

According to the present disclosure, when using a gas filled balloon, there may be provided a docking station for the Aerial Unit to autonomously return to where the station connects with the balloon and refill the balloon with gas as required.

According to the present disclosure, there may be provided a docking station for the Aerial Unit to autonomously return to where the station connects with the belt and recharges the belt battery as required.

According to the technology in the present disclosure, the user may be able to experience a video call in a manner which will be very close to a real face to face conversation in the user's natural environment with regards to the instinctive behavior people position themselves in relativity to their peers and environmental conditions during a conversation, as further detailed herein. The present disclosure provides the display the ability to imitate human behavior with regards to its positioning in relation to the local user.

In accordance with an aspect of the presently disclosed subject matter, there is provided a teleconferencing device comprising: a propulsion system for flying the teleconferencing device having a surface, the propulsion system capable of making the teleconferencing device hover in place and change its position; a projection unit capable of projecting images on at least a given part of the surface having a fixed position with respect to the projection unit; at least one sensor capable of obtaining information enabling mapping an environment surrounding the teleconferencing device; and a processing unit, configured to: obtain information from the at least one sensor; map the environment surrounding the teleconferencing device, using the obtained information, the environment including at least one user of the teleconferencing device;

track, within the mapped environment, a position and an orientation of at least one user of the teleconferencing device with respect to the teleconferencing device; determine a desired position and orientation of the given part of the surface with respect to the at least one user based at least on the tracked position and orientation of the at least one user and on one or more session related parameters; activate the propulsion system to fly the teleconferencing device to the determined desired position and orientation upon the given part of the surface not being positioned in the determined desired position and orientation; receive a stream of images captured by a remote device; and instruct the projection unit to project the received stream of images on the given part of the surface.

In some cases, the session related parameters include a measured signal strength or signal quality of a network connection through which the stream of images is received.

In some cases, the processing unit is further configured to estimate a viewing quality of the images viewed by the user, and wherein the session related parameters include the estimated viewing quality.

In some cases, the teleconferencing device further comprising at least one speaker, and the processing unit is further configured to: receive a stream of sound captured by the remote device; output the sound to the at least one user via the at least one speaker; and estimate a sound quality of the sound received by the user; and wherein the session related parameters include the estimated sound quality.

In some cases, the teleconferencing device, further comprises at least one microphone, and the processing unit is further configured to acquire sound using the microphone and determine an ambient noise level by analyzing the acquired sound, and wherein the session related parameters include the determined ambient noise level.

In some cases, the processing unit is further configured to determine at least one of (a) amounts of light and (b) directions of light, in a respective plurality of positions in the environment surrounding the teleconferencing device, and wherein the session related parameters include the determined amounts of light or directions of light.

In some cases, the teleconferencing device, further comprises a mechanical attachment capable of attaching to a balloon for causing air buoyancy of the teleconferencing device, and wherein the surface is a surface of the balloon.

In some cases, the propulsion system comprises air jets.

In some cases, the hovering is obtained by air buoyancy caused by the balloon.

In some cases, the desired position and orientation is determined so that a clear line of sight is maintained between the given part of the surface and the at least one user.

In some cases, the sensor is at least one camera.

In some cases, the processing unit is further configured to classify a use scenario of the teleconferencing device, utilizing the mapped environment and using a use scenario classifier; and wherein the desired position and orientation is determined using the use scenario.

In some cases, the use scenario classifier is configured to classify the mapped environment into a given use scenario of a plurality of pre-classified use scenarios, each pre-classified use scenario of the pre-classified use scenarios simulating a respective distinct behavior of a physically present user had the teleconferencing device been the physically present user.

In some cases, the classifier performs the classification based on one or more of: an activity performed by the user, a facial expression of the user, a voice volume of the user, a vocal expression of the user, a change in body movement rate of the user, a change in the user's body position, or a change in the user's body behavior.

In some cases, the use scenario classifier is a machine-learning classifier.

In accordance with another aspect of the presently disclosed subject matter, there is provided a method of operating a teleconferencing device, the method comprising: a propulsion system for flying the teleconferencing device having a surface, the propulsion system capable of making the teleconferencing device hover in place and change its position; a projection unit capable of projecting images on at least a given part of the surface having a fixed position with respect to the projection unit; at least one sensor capable of obtaining information enabling mapping an environment surrounding the teleconferencing device; and a processing unit, configured to: obtaining information from at least one sensor of the teleconferencing device, the sensor capable of obtaining information enabling mapping an environment surrounding the teleconferencing device; mapping the environment surrounding the teleconferencing device, using the obtained information, the environment including at least one user of the teleconferencing device; tracking, within the mapped environment, a position and an orientation of at least one user of the teleconferencing device with respect to the teleconferencing device; determining a desired position and orientation of the given part of a surface of the teleconferencing device with respect to the at least one user based at least on the tracked position and orientation of the at least one user and on one or more session related parameters; activating a propulsion system of the teleconferencing device to fly the teleconferencing device to the determined desired position and orientation upon the given part of the surface not being positioned in the determined desired position and orientation, wherein the propulsion system is capable of making the teleconferencing device hover in place and change its position; receiving a stream of images captured by a remote device; and instructing a projection unit, capable of projecting images on at least a given part of the surface having a fixed position with respect to the projection unit, to project the received stream of images on the given part of the surface.

In some cases, the session related parameters include a measured signal strength or signal quality of a network connection through which the stream of images is received.

In some cases, the method further comprises estimating a viewing quality of the images viewed by the user, and wherein the session related parameters include the estimated viewing quality.

In some cases, the method further comprises: receiving a stream of sound captured by the remote device; outputting the sound to the at least one user via at least one speaker of the teleconferencing device; estimating a sound quality of the sound received by the user; and wherein the session related parameters include the estimated sound quality.

In some cases, the method further comprises acquiring sound using a microphone of the teleconferencing device and determining an ambient noise level by analyzing the acquired sound, and wherein the session related parameters include the determined ambient noise level.

In some cases, the method further comprises determining at least one of (a) amounts of light and (b) directions of light, in a respective plurality of positions in the environment surrounding the teleconferencing device, and wherein the session related parameters include the determined amounts of light or directions of light.

In some cases, the teleconferencing device further comprises a mechanical attachment capable of attaching it to a balloon for causing air buoyancy of the teleconferencing device, and wherein the surface is a surface of the balloon.

In some cases, the propulsion system comprises air jets.

In some cases, the hovering is obtained by air buoyancy caused by the balloon.

In some cases, the desired position and orientation is determined so that a clear line of sight is maintained between the given part of the surface and the at least one user.

In some cases, the sensor is at least one camera.

In some cases, the method further comprises classifying a use scenario of the teleconferencing device, utilizing the mapped environment and using a use scenario classifier; and wherein the desired position and orientation is determined using the use scenario.

In some cases, the use scenario classifier is configured to classify the mapped environment into a given use scenario of a plurality of pre-classified use scenarios, each pre-classified use scenario of the pre-classified use scenarios simulating a respective distinct behavior of a physically present user had the teleconferencing device been the physically present user.

In some cases, the classifier performs the classification based on one or more of: an activity performed by the user, a facial expression of the user, a voice volume of the user, a vocal expression of the user, a change in body movement rate of the user, a change in the user's body position, or a change in the user's body behavior.

In some cases, the use scenario classifier is a machine-learning classifier.

BRIEF DESCRIPTION OF THE DRAWINGS

FIG. 13 is a flowchart diagram illustrating an example of the system process for a video call from one end point.

DETAILED DESCRIPTION

Figure 1:
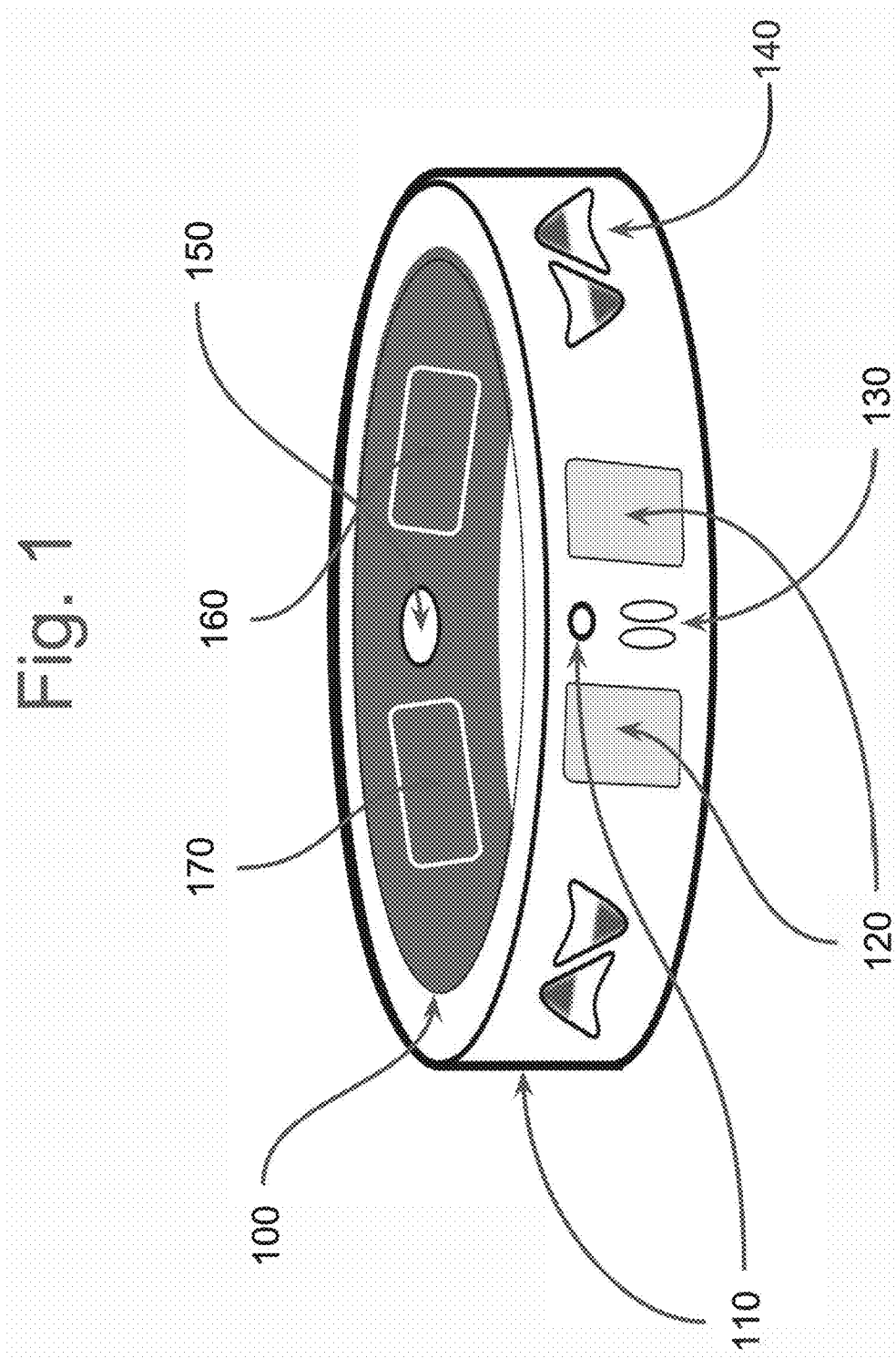
FIG. 1 is an explanatory diagram illustrating a belt connectable to a balloon and its components.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "mapping", "tracking", "determining", "activating", "receiving", "instructing", "estimating", "outputting", "acquiring", "analyzing", "classifying" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 11:
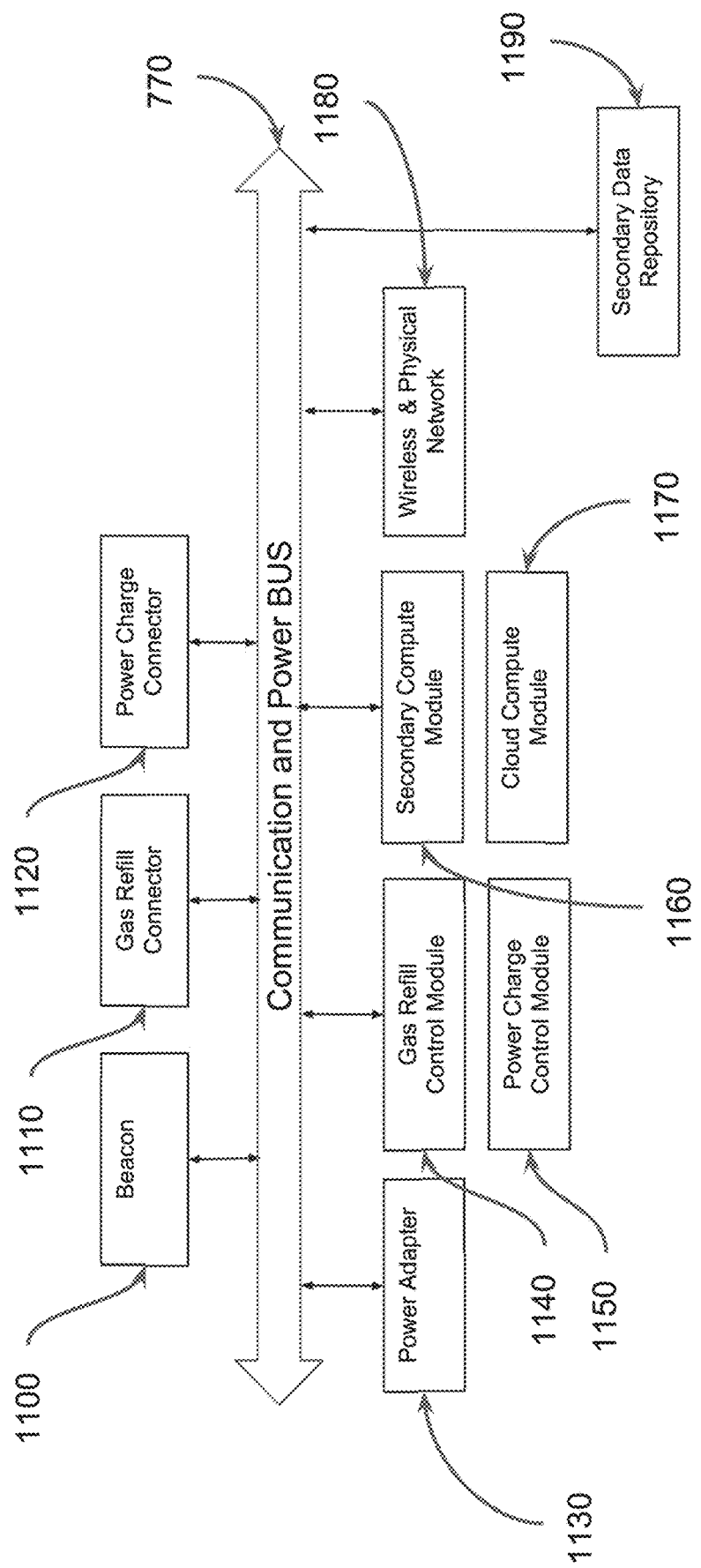
FIG. 11 is a block diagram illustrating an example of the modules required for the docking station functionality in the system.
Figure 12:
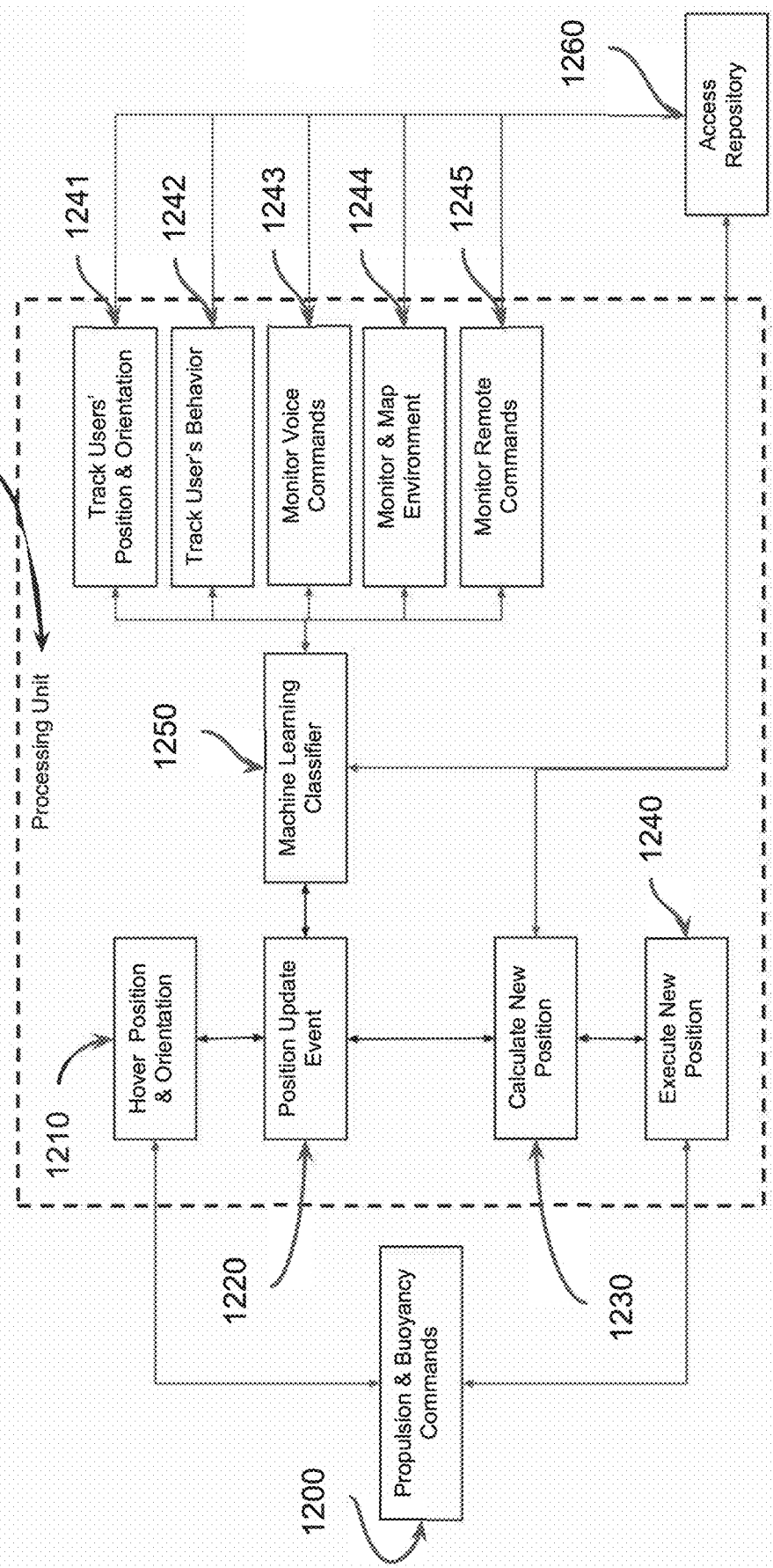
FIG. 12 is a flowchart diagram illustrating an example of the system process for maintaining and updating the position and orientation according to various monitoring inputs.

In embodiments of the presently disclosed subject matter, fewer, more and/or different stages than those shown in FIGS. 12-13 may be executed. In embodiments of the presently disclosed subject matter one or more stages illustrated in FIGS. 12-13 may be executed in a different order and/or one or more groups of stages may be executed simultaneously. FIGS. 1-11 illustrate a general schematic of the system architecture in accordance with an embodiment of the presently disclosed subject matter. Each module in FIGS. 1-11 can be made up of any combination of software, hardware and/or firmware that performs the functions as defined and explained herein. The modules in FIGS. 1-11 may be centralized in one location or dispersed over more than one location. In other embodiments of the presently disclosed subject matter, the system may comprise fewer, more, and/or different modules than those shown in FIGS. 1-11.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, showing an explanatory diagram illustrating an example of a belt and its components. The Belt 100 may be lighter than 50 grams and may be optionally used as a physical container holding the required components of the system to be attached to an optionally buoyant balloon. In some cases, components may be installed in or on other locations than specifically the belt, for example and not limited to: On the balloon itself, in the balloon, on the docking station, on the walls in a room, as part of other electronic devices, on wearable cloths, as virtual and/or augmented reality glasses and more. The Belt 100 may contain one or more Cameras 110 to facilitate navigation, video calling, obstacle detection, environment mapping and user physical and behavioral tracking. The Belt 100 may also contain one or more Speakers 120 used for video calling and to optionally generate sounds for the users. The Belt 100 may also contain Microphones 130 used for video calling and for measuring ambient sound levels. The Belt 100 may also contain air jets or other Propulsion Mechanisms 140 which optionally propel air in specific directions and velocity to control the system's hovering and movement capabilities. The Belt 100 may also contain a Projector 150 which is optionally used to project the display for video calling. Additional examples for display methods may optionally be: a projector installed on or in the balloon, a projector installed externally to the whole system, a display installed on the boundary/surface of the balloon or others. The Belt 100 may also contain a Rechargeable Battery 160 which optionally will power all the devices and modules on the belt. The Belt 100 may also contain a compute and Network Module 170 which optionally holds the required electronics for computer processing, controllers and wireless networking. As indicated herein, it is to be noted that in some cases, the Cameras 110, the Speakers 120, the Microphones 130, the Projector 150 and any processing resource used to operate the Belt 100 and/or the other components, can be external to the Belt 100, and the Belt 100 can communicate therewith via a wired/wireless connection. It is to be further noted that the processing resources (also referred to herein as processing unit/s) can optionally be distributed.

Figure 2:
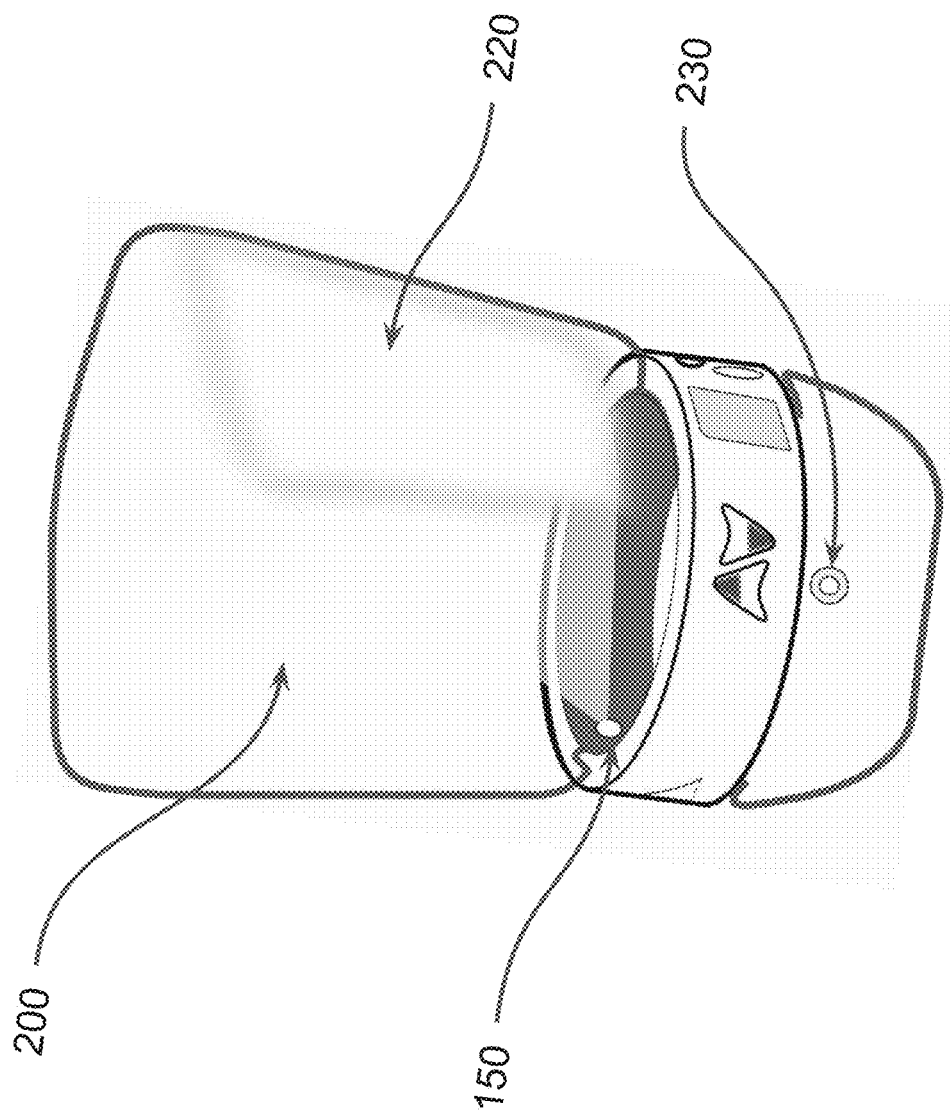
FIG. 2 is an explanatory diagram illustrating a balloon and its components.

FIG. 2 is an explanatory diagram illustrating an example of a buoyant Balloon 200 and its components. The Balloon 200 may hold a lighter than air gas such as Helium, for example, to provide lift of the whole system so that energy would not be wasted on hoovering. The Balloon 200 may contain an at least partially transparent surface right in front of the external Projector 150 so that the projection could optionally go through one side of the Balloon 200 and appear on the opposite Surface 220 which is optionally partially transparent allowing users to view the image on that external Surface 220 of the Balloon 200 from the outside. The Balloon 200 may also contain a gas Refill Connector 230 through which, optionally, lighter than air gas, such as Helium, for example, can be injected. The Refill Connector 230 may connect directly to an external gas source our may be connected to that external gas source through an additional adaptor on the Belt 100.

Figure 3:
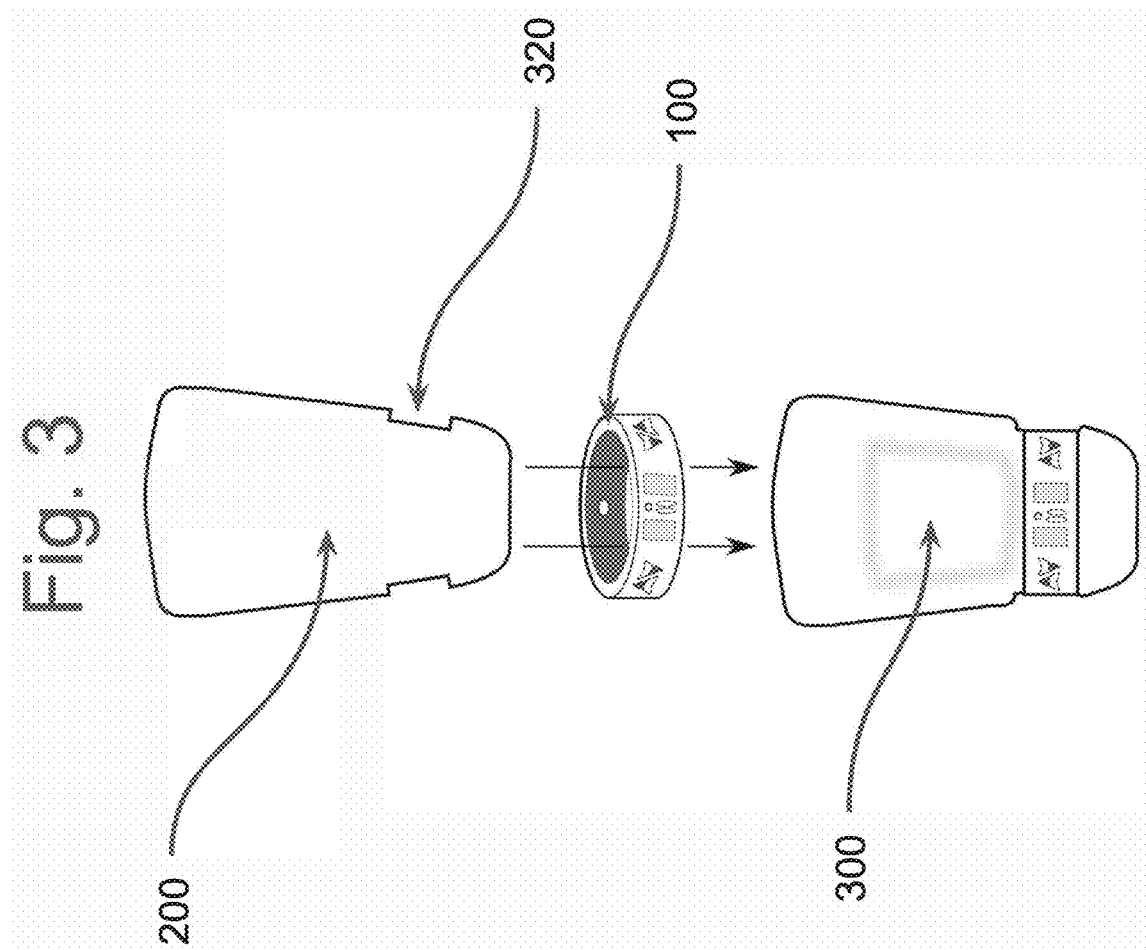
FIG. 3 is an explanatory diagram illustrating a connection mechanism for connecting and disconnecting a balloon to/from a belt.

FIG. 3 is an explanatory diagram illustrating an example of a method for the Belt 100 and Balloon 200 to mechanically attach without the need of any additional connecting elements such as glue, screws, bolts or other mechanisms. The Balloon 200 may have a Hip Shape 320 for example where the Belt 100 could fit into so that no force would be required for the Belt 100 to stay in place. Mechanically attaching the Belt 100 together with the Balloon 200 may create a Video Call Aerial Unit 300 which is an example to the embodiment of this presently disclosed subject matter.

It is to be noted that although FIGS. 2 & 3 refer to a Balloon 200 and a Belt 100, the presently disclosed subject matter is applicable also on other flying/buoyant devices (e.g. drones) mutatis mutandis.

Figure 4:
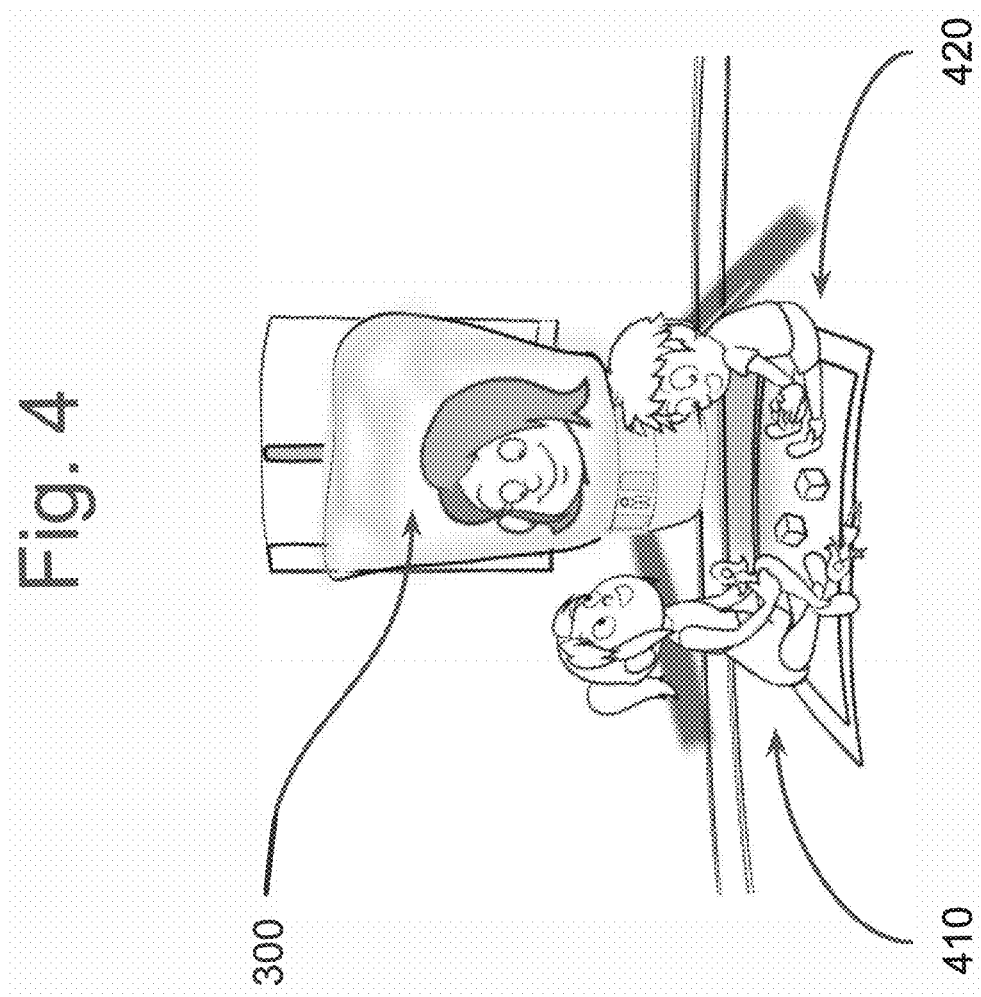
FIG. 4 is an explanatory diagram illustrating an exemplary position selected by the system according to the presented scenario requiring a position between the two children.

FIG. 4 is an explanatory diagram of an example for a desired position and orientation of the Video Call Aerial Unit 300 (that can be a Balloon 200 and a Belt 100, or any other flying/buoyant device) according to the optional scene presented of a First Child 410 and a Second Child 420 facing each other while sitting and playing with toys. The desired position for the Video Call Aerial Unit 300, in this example, is as if the parent would be sitting with the two children in a circle while facing them both.

Figure 5:
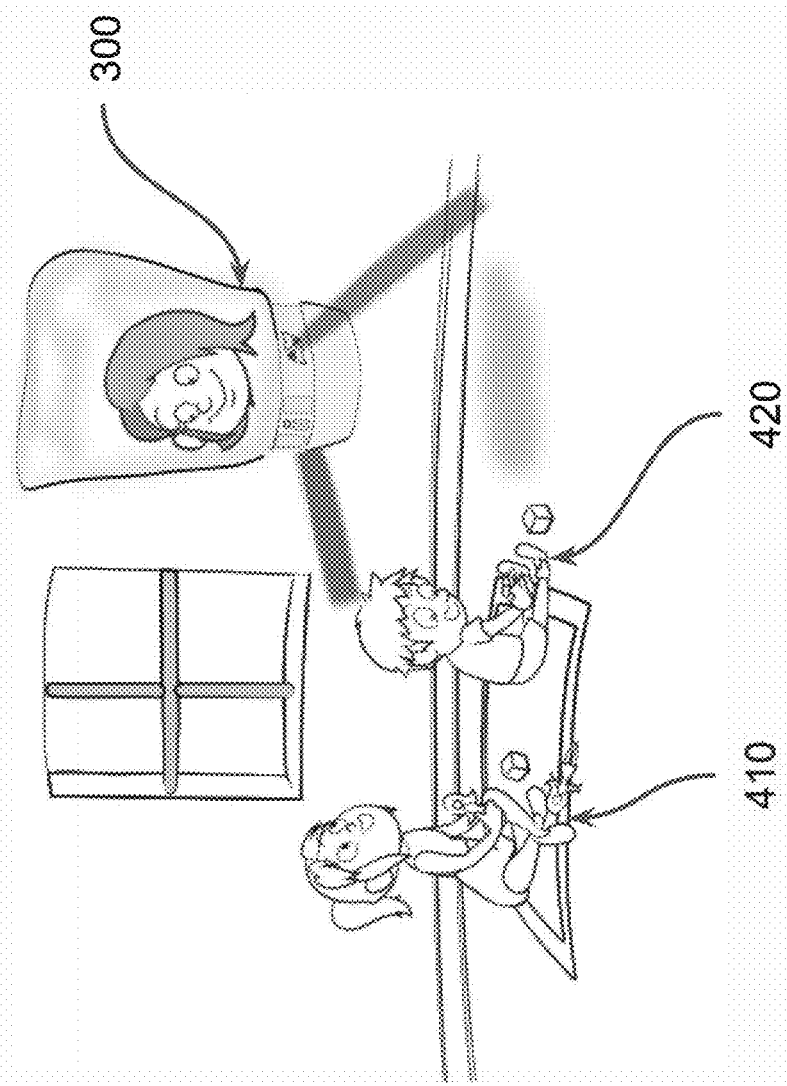
FIG. 5 is an explanatory diagram illustrating an exemplary position selected by the system according the presented scenario required a position on one side facing the two children.

FIG. 5 is an explanatory diagram of another example for a preferred position and orientation of the Video Call Aerial Unit 300 according to the scene presented of the First Child 410 staying in the same position as in FIG. 4, and the Second Child 420 turning around and facing the same direction as the First Child 410.

In the exemplary scene, the desired position and orientation of the Video Call Aerial Unit 300 requires the movement of the Aerial Unit 300 to the right, facing the two children. The desired change in the Video Call Aerial Unit 300 position can be determined as further detailed herein, inter alia with reference to FIG. 12.

In this exemplary scenario, the change of the Second Child's 420 position may be captured by the Cameras 700 which may pass the obtained information to the Track Users' Position and Orientation 1241 which may detect a change in the Second Child's 420 position and may also detect that the First Child 410 has maintained the same position and orientation as before. The Cameras 700 may also pass the obtained information to the Track Users' Behavior module 1242 which may detect a change in the Second Child's 420 facial and/or body expressions or other behavioral indicators. The detected changed may be passed to the Machine Learning Classifier 1250 which may compare the new scene to a history of recorded scenes in order to optionally decide on a need for the Video Call Aerial Unit 300 to change its position and orientation. In cases the decision was made, the Machine Learning Classifier 1250 may initialize a Position Update Event 1220 which may initiate a Calculate New Position 1230 which may initiate an Execute New Position 1240 which may send a set of commands to the Propulsion & Buoyancy Commands 1200 to physically move the Video Call Aerial Unit 300 to its new desired position.

Figure 6:
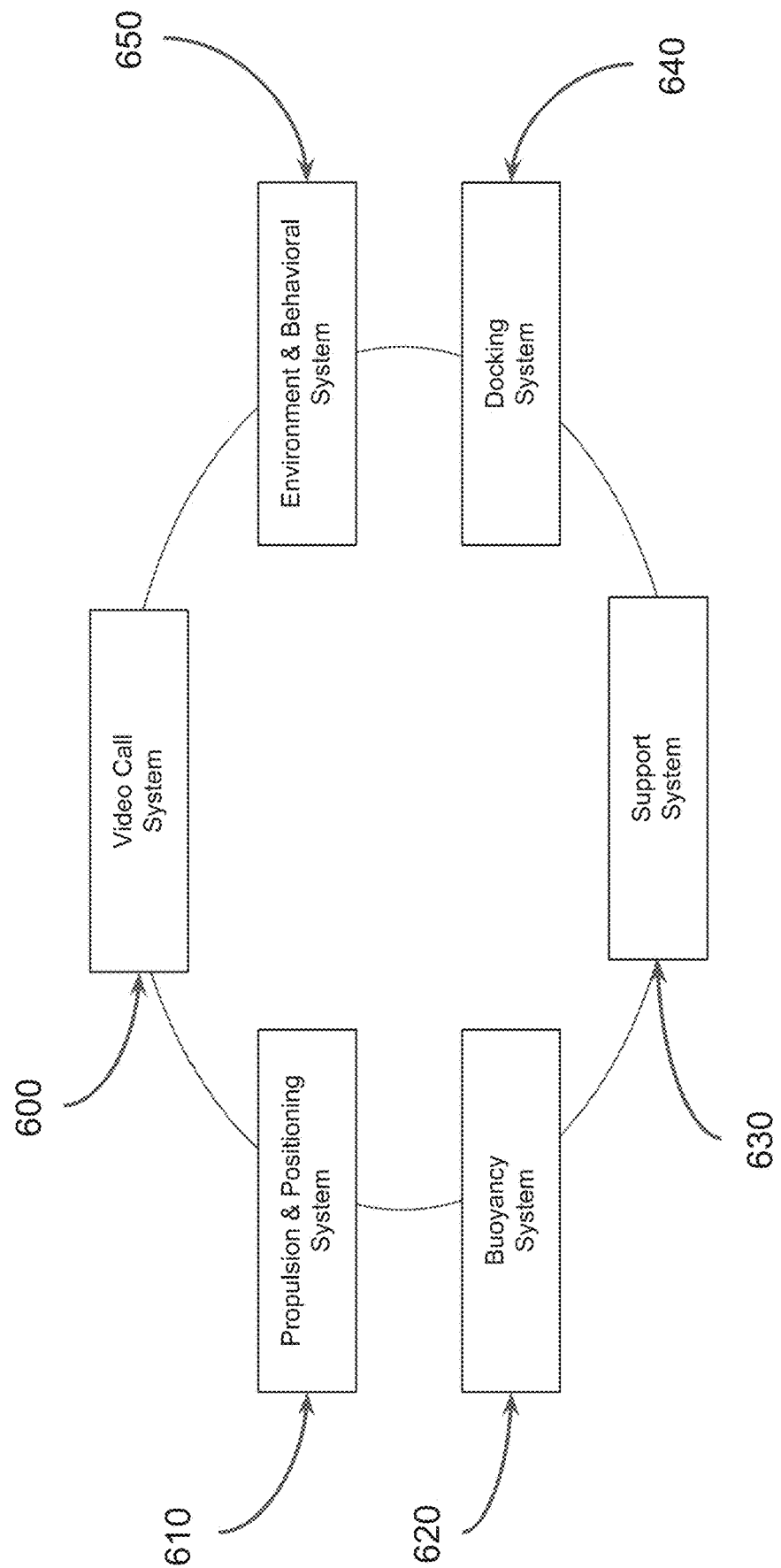
FIG. 6 is a block diagram illustrating an example of the system modules required for the proposed solution.

FIG. 6 is a block diagram illustrating an example of the device modules required for the proposed solution. The Video Call Aerial Unit 300 may comprise of the Balloon 200 and the Belt 100. The Balloon and the Belt 100 may comprise of the device modules listed in FIG. 6. The device modules may be physically located and connected to the Video Call Aerial Unit 300 or may be located on a different physical location and connected by wire or wireless network.

The Video Call System 600 may contain required software and hardware modules to hold a video call between two or more users, or it may otherwise be wire or wirelessly connected to other devices that can provide it with some of the functionalities. The additional endpoints may be an additional similar endpoint or various existing endpoints such as private computers, mobile phones, tablets and other examples. The Propulsion and Positioning System 610 may contain the required software and hardware modules required to hover in a preferred position and orientation and/or to change that position and orientation according to the inputs of the other systems. When using a Video Call Aerial Unit 300 that is comprised of a Balloon 100 and Belt 200, the Video Call System 600 can comprise a Buoyancy System 620 that may be responsible for maintaining the lighter than air gas, such as Helium, and keeping the Video Call Aerial Unit 300 at a weight equilibrium to reduce energy consumption wasted on hovering. The Environment and Behavioral System 650 may be responsible for sensing and mapping the environment for the purpose of autonomous movement as well as sensing and tracking the user movements and user behavior in order to, optionally, decide on additional movements and changes of the position and orientation of the Video Call Aerial Unit 300 desired for a more natural feeling video call.

The Docking System 640 may be responsible for holding the Video Call Aerial Unit 300 when it is not active and for replenishing the system's resources for example, recharging the battery and refilling the buoyancy gas.

The Support System 630 may provide additional network and compute modules which may be required in cases where additional compute, memory storage and other resources are required but cannot be added directly to the Video Call Aerial Unit 300 for different reasons such as weight limitations. The Support System 630 may be located, for example, on the Docking System 640 or in a compute cloud.

Figure 7:
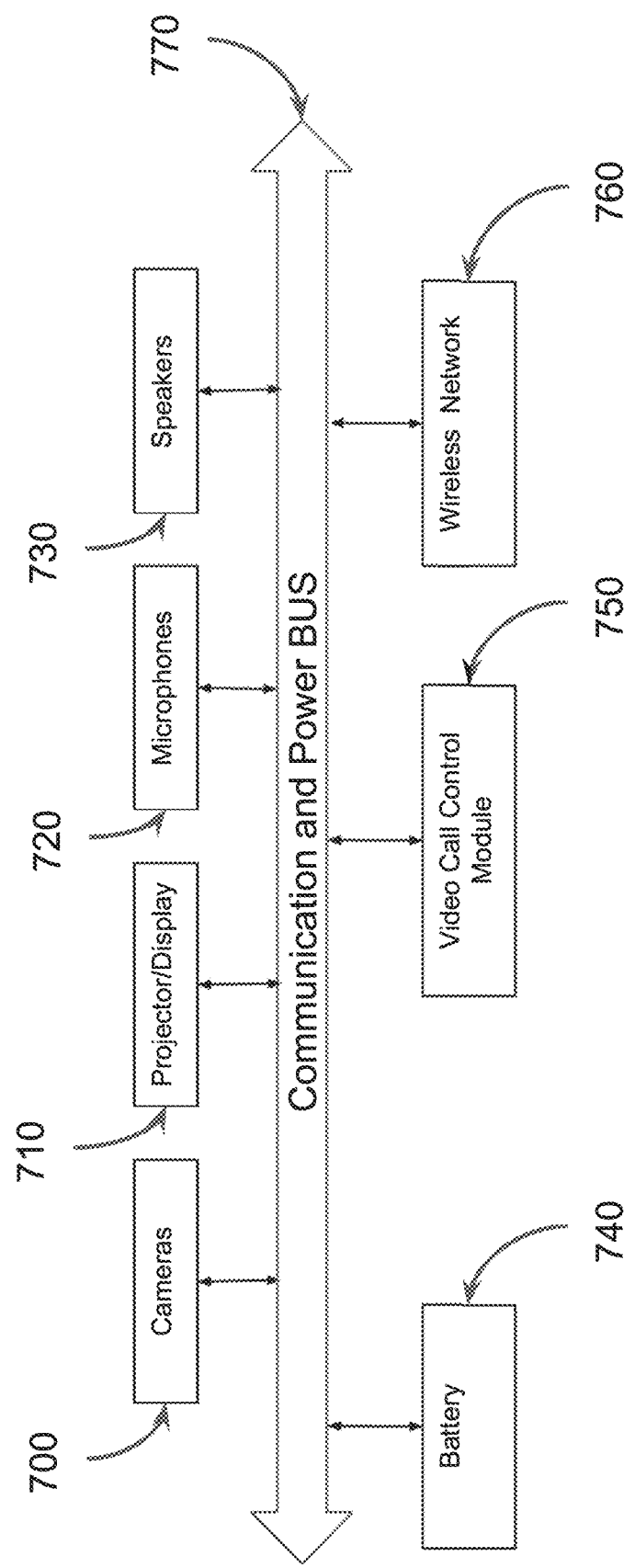
FIG. 7 is a block diagram illustrating an example of the modules required for the video call functionality in the system.

FIG. 7 is a block diagram illustrating an example of the modules that may be required for the video call functionality in the system. One or more Cameras 700 may be required to acquire video of one or more users of one endpoint. The video may be streamed via the Communication Bus 770 to the Wireless Network 760 through which the video stream may be streamed to another endpoint. The Projector/Display 710 may be used to display the video stream received from the other endpoints as they may be received from the Wireless Network 760. The Microphones 720 may be used to receive the audio sounds from one or more users and, optionally, stream them in a similar manner as the video stream. The Speakers 730 may be used to transmit the audio to the local users as the audio was, optionally, streamed from the other end points through the Wireless Network 760. The Battery 740 may provide the power to all the components and modules, optionally, through the Communication and Power BUS 770 in the local system. The Video Call Control Module 750 may be comprised of hardware and software and may be responsible, for example, for coordinating the video calls, managing the endpoints and contacts, checking endpoint connectivity, availability and controlling the video calling hardware components. The Wireless Network 760 may be responsible for connecting the system to a local modem or router through which the required network services may be provided. The Wireless Network 760 can operate through various RF or lighting mediums for example but not limited to: Bluetooth, WIFI, P2P Laser, Cellular Data Networks.

Figure 8:
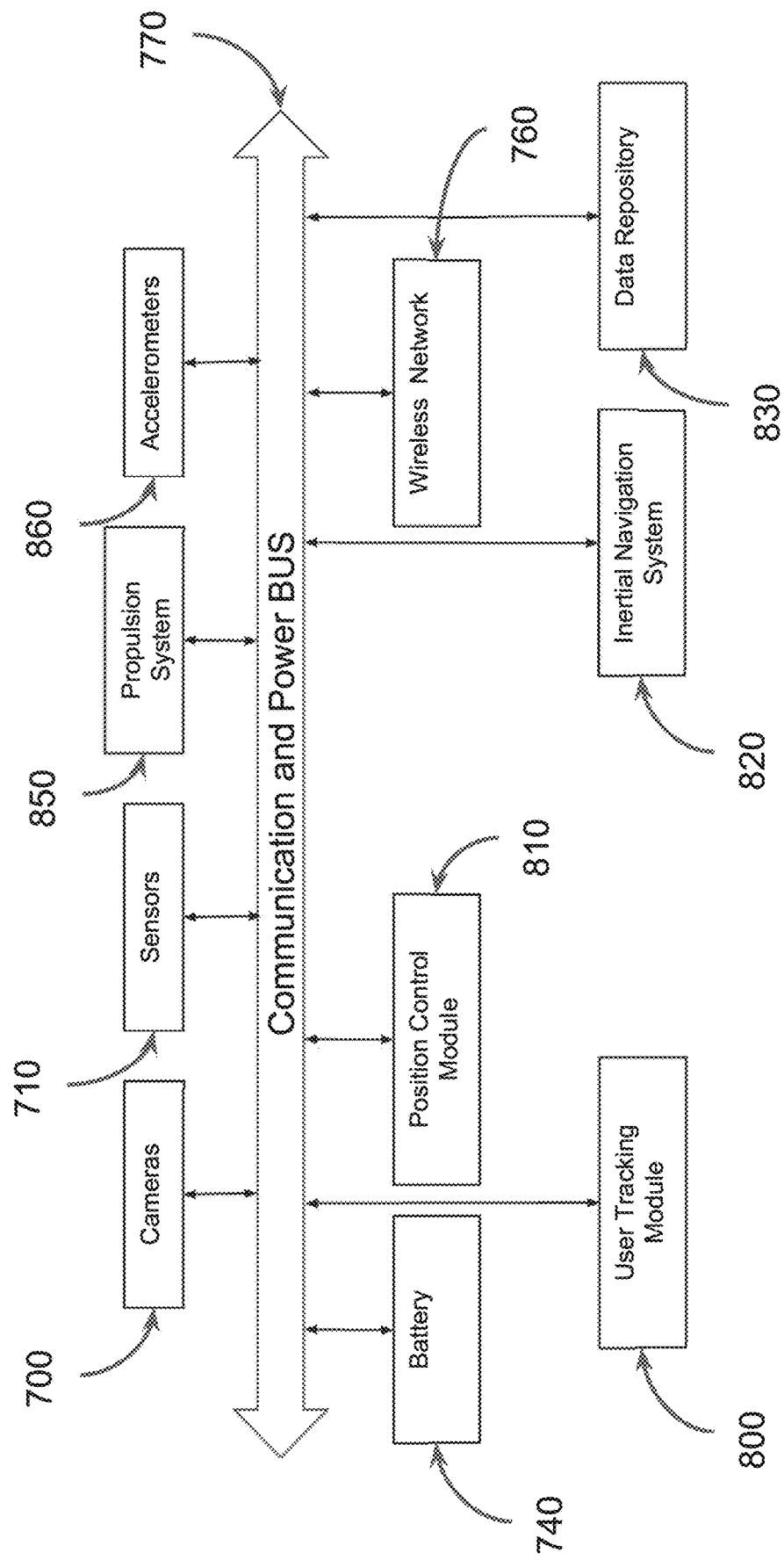
FIG. 8 is a block diagram illustrating an example of the modules required for the autonomous movement functionality in the system.

FIG. 8 is a block diagram illustrating an example of the modules that may be required for the autonomous movement functionality in the system. The Cameras 700 may be the same Cameras 700 used for the Video calls or, optionally, additional dedicated Cameras. The Cameras 700 may be used to obtain information and upload images to the Position Control Module which through, optionally, image recognition algorithms can identify if the Video Call Aerial Unit 300 has moved and to derive the required response to correct the position by, optionally, sending commands to the Propulsion System 850. The Sensors 710 may be for example: LIDAR, Ultrasonic sensors and/or Radar sensors, or any other device which enables monitoring movement and/or the environment. Together with the Cameras 720, the Sensors 710 may record the environment including walls, furniture, lamps and other potential obstacles. The mappings may be compared to previously mapped environments and uploaded to the Data Repository 830. The Propulsion System 850 may be based on various solutions for example but not limited to: air jets, propellers or air compressors. The Accelerometers 860 may also be used to monitor the Video Call Aerial Unit 300 movements and, optionally, send their measurements to the Position Control Module 810 for additional corrections. The User Tracking Module 800 may receive images from the Cameras 700, optionally identify the users to be tracked, optionally receive additional inputs from the Environment and Behavioral System 650 and, optionally send desired position updates to the Position Control Module 810. The Inertial Navigation System 820 may be used to provide a point of reference for the current position and orientation of the Video Call Aerial Unit 300 and may send its parameters to the Position and Control Module 810.

Figure 9:
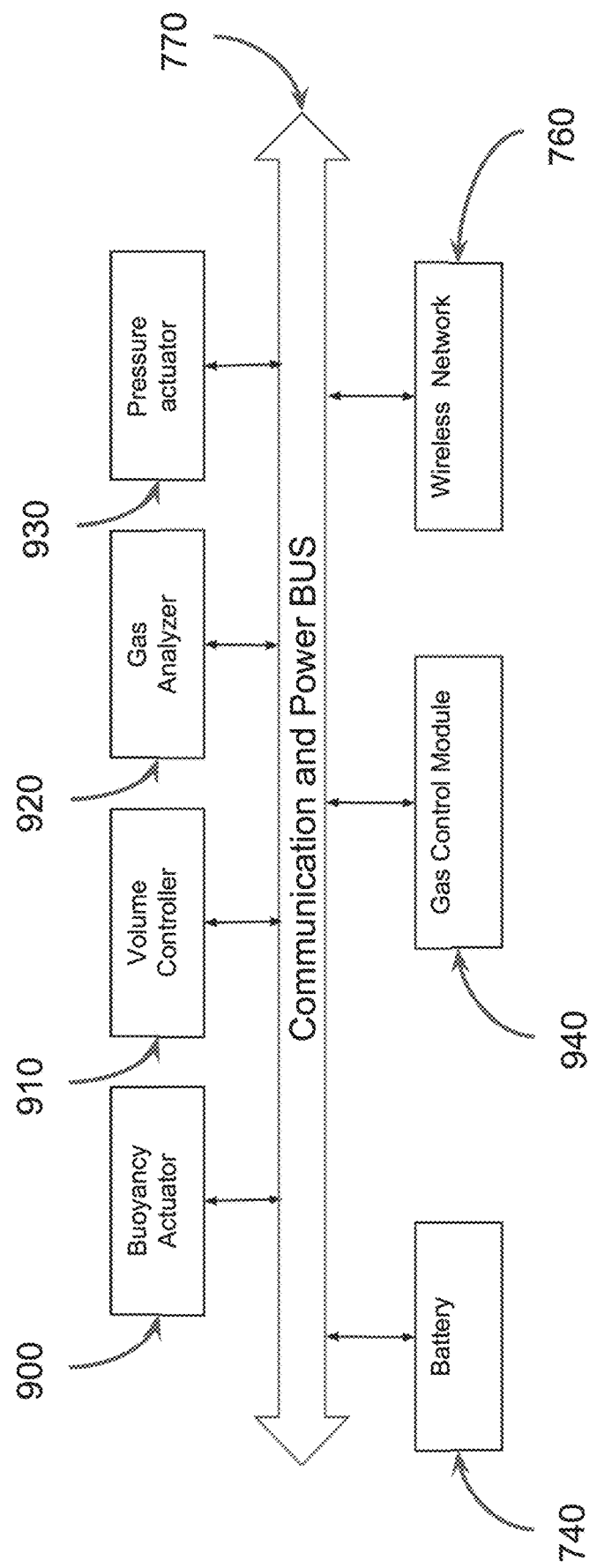
FIG. 9 is a block diagram illustrating an example of the modules required for the buoyancy functionality in the system.

FIG. 9 is a block diagram illustrating an example of the modules required for the buoyancy functionality in the system when using a balloon 200 and belt 100. The Buoyancy Actuator 900 may measure the force between the Balloon 200 and Belt 100. Changes in the measured force may be sent to the Gas Control Module 940 so that it can, optionally, make changes to the gas volume or gas Concentration to reach Buoyancy equilibrium. The Volume Controller 910 may enable the physical increase or decrease of gas volume by, optionally, changing the surface area of the Balloon 200. The Gas Analyzer 920 may measure the concentration of the buoyant gas and may send a required change to the Gas Control Module 940 so that it may, optionally, request a refill of higher concentration gas from an external source on the Docking System 640, for example. The Pressure Actuator 930 may measure the pressure level of the gas inside the Balloon 200 and may send the Gas Control Module 940 the pressure levels so that the Gas Control Module 940 may decide if it change the pressure levels by, optionally, adding or removing gas.

Figure 10:
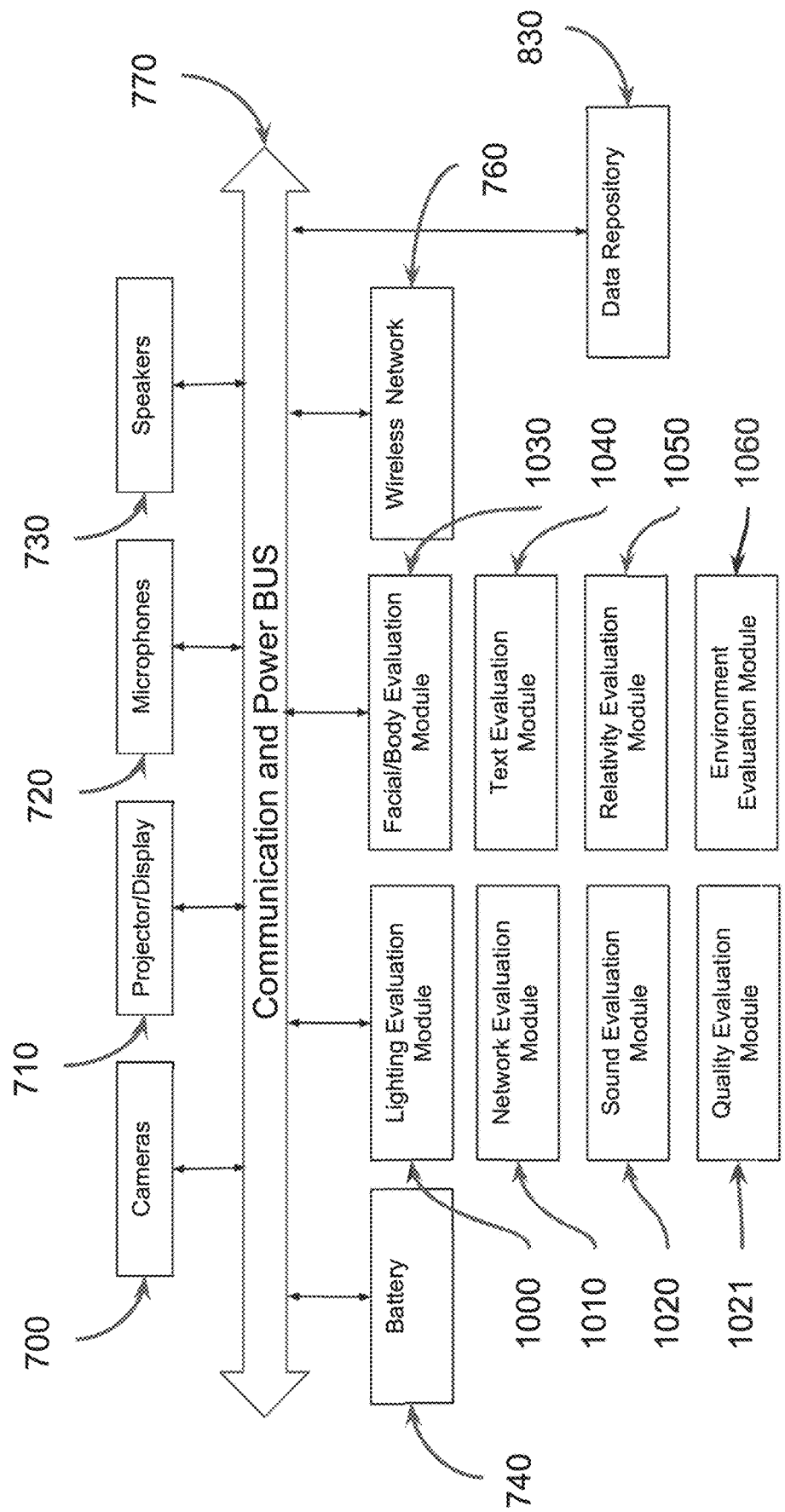
FIG. 10 is a block diagram illustrating an example of the modules required for the physical and behavioral user tracking functionality in the system.

FIG. 10 is a block diagram illustrating an example of the modules required for the Environment and Behavioral functionality 650 in the system. The optional input and output devices including but not limited to the: Cameras 700, Projector/Display 710, Microphones 720, Speakers 730 and other potential sensors may be used for additional purposes proposed in the other figures and or may be separate and dedicated to the purpose of the functionality proposed in FIG. 10. The Environment and Behavioral System 650 may be responsible for tracking, detecting, analyzing and sending commands to the other subsystems such as the Position Control Module 810, in FIG. 8. Examples for session related parameters which may be evaluated in order to, optionally, update the Video Call Aerial Unit's 300 position may include Lighting Evaluation Module 1000 where for example the system may detect potential locations with less amount of light and move the Video Call Aerial Unit 300 to that location in order to be able to reduce the brightness of the Projector/Display 710 and conserve battery power. Another example for the Lighting Evaluation Module 1000 may be to detect that a strong light source is at the same line of sight to the local user as the Video Call Aerial Unit 300 and optionally move the Video Call Aerial Unit 300 to a different vector from the vector of the strong light from a specific direction such as sunlight coming through a window. The Network Evaluation Module 1010 may, for example, monitor the signal strength of the wireless network and upon detecting an area where the network connection strength is weak enough to affect the video call streaming or other aspects the Network Evaluation Module 1010 may send a command requesting for a position change to an, optionally, saved location where the network strength was previously measured to be stronger. The Sound Evaluation Module 1020 may, for example, acquire and monitor the background ambient noise level next to the local user and optionally send a command to move the Video Call Aerial Unit 300 closer to the local user so that that user may hear the Video Call Aerial Unit's Speakers 730 better and to be able to receive the local user's audio better through the Microphone 720. Another example may be for the Sounds Evaluation Module 1020 to instruct the Video Call Aerial Unit 300 to change its orientation in order to, optionally, focus its microphone 720 and speakers 730 towards a specific local user or to turn the Microphone 720 away from a strong sound source such as an active air conditioner. The Quality Evaluation Module 1021 may, for example, monitor the image and sound quality of the video call and send position changes requests accordingly. For example, if the image quality of the local user is low as a result, for example, of the distance from the camera 700 or the amount of light or other reasons, the Video Call Aerial Unit 300 may need to get closer or change its relative position to the local user to improve the image quality. An additional example, if the estimated sound quality received by the local user is below an acceptable threshold, the Video Call Aerial Unit 300 may change its position and orientation to improve the direction of the speakers, get closer to the local user and/or optionally turn up the audio sound level. The Facial/Body Evaluation Module 1030 may, for example, monitor the facial expressions of the local or remote user in order to, optionally, detect expressions which may indicate a need for a position or orientation change of the Video Call Aerial Unit 300. For example, if a user is squinting his eyes in an effort to see what is on the Projector/Display 710, the Facial/Body Evaluation Module 1030 may send a request for the Video Call Aerial Unit 300 to move closer to that user or if it's the case of the remote user squinting, request for the local Video Call Aerial Unit 300 to move closer to the local user to optionally increase the local user's size. In an additional example, a user who is slightly turning his head when trying to listen to the audio from the Video Call Aerial Unit 300 and might be raising his hand next to his ear, the Facial/Body Evaluation Module 1030 may identify the expression as an attempt to hear better and may send a command to change the Video Call Aerial Unit's 300 position or to increase the speaker volume. An additional example may be to identify from the facial and hand gestures if the Video Call Aerial Unit 300 may be positioned to close to the user. In a natural conversation people may be accustomed to a minimal private space of approximately half a meter but the distance may be different from one person to another, from one culture to another and according to other environmental factors such as, but not limited to: room size, available open space in the room, background noise, obstacles and more. The Facia/Body Evaluation Module 1030 may detect the local user is uncomfortable if his head is tilted backwards, his hands are crossed or other facial gestures of discomfort. The detection of these and other optional scenarios which may require a change in position and orientation of the Video Call Aerial Unit 300 may also be a result of analyzing the words said by the users through, optionally, the Text Evaluation Module 1040. For example, if a user is asking repeatedly "what" the Text Evaluation Module 1040 may translate the input as a request for the Video Call Aerial Unit 300 to move closer and/or to increase its volume. The Text Evaluation Module 1040 may also detect directly verbal commands from the different users requesting an action to be taken such as, for example, "come closer", "move back", "end call", "turn away", "find John" and more. The Relativity Evaluation Module 1050 may, for example, detect that there is more than one local user in the conversation and request the Video Call Aerial Unit 300 to move to a new position and orientation in order to mimic the position and orientation a real person would choose. The movement change from FIG. 4 to FIG. 5 may be one of many examples for such a position and orientation. The Environment Evaluation Module 1060 may, for example, detect the room layout, the location of the walls, floors, ceilings, doors, stairs, windows, furniture, lighting and optionally any other object that may have an impact on the movement, potential movement, position, orientation or any other factor of the Video Call Aerial Unit 300. The Environment Evaluation Module 1060 may also validate the desired position and orientation maintains a clear line of site for the Camera to clearly capture the local user and for the local user to clearly view the full display surface on the Video Call Aerial Unit 300. The different requests from the different Modules in FIG. 10 may be sent to the Position Control Module 810 which may add additional inputs for other Modules in order to optionally synthesize the various inputs into a final decision on a position and orientation change of the Video Call Aerial Unit 300. The different Modules in FIG. 10 may, optionally, use specific algorithms or Machine Learning based algorithms in order to, for example: detect, analyze, compute or any other type of required analysis. The Data Repository 830 may be used to store, edit and update and retrieve various reference data required for the different Modules, the Modules' algorithms, Machine learning algorithms or any other optional component of the system.

FIG. 11 is a block diagram illustrating an example of the modules required for the Docking System functionality in the system. The Beacon Module 1100 may, for example, transmit an RF signal to be detected by one of the sensors on the Video Call Aerial Unit 300 to, optionally, assist the Video Call Aerial Unit 300 in locating and returning to the Docking System 640. The Gas Refill Connector 1110 may, for example, connect to the Balloon 200 through the Balloon refill connector 230, and optionally refill the Balloon 200 with Buoyant gas as optionally instructed by the Gas Refill Control Module 1140. The Power Charge Connector 1120 may, for example, connect to the Battery 160 to optionally recharge the battery as optionally instructed by the Power Charge Control Module 1150. The Power Adapter 1130 may, for example, connect to an external wall socket and optionally provide power to the Docking System and its modules. The Secondary Compute Module 1160 may contain additional compute, storage, memory and other components to optionally support, or replace, the compute module 170 on the Video Call Aerial Unit 300, e.g. in example cases where additional compute power is required. The Cloud Compute Module 1170 may extend the Secondary Compute Module 1160 to leverage optionally existing cloud compute systems for additional compute, storage, memory and other components to optionally support the compute module 170 on the Video Call Aerial Unit 300. The Wireless & Physical Network 1180 may, for example, provide network connectivity to the Video Call Aerial Unit 300 by optionally connecting to the Wireless Network 760 when the Video Call Aerial Unit 300 is not physically connected to the Docking System. The Wireless and Physical Network 1180 may also connect optionally through a physical cable or optionally an additional wireless connector to a local modem or router or remote Cellular Data Network for different functionalities for example but not limited to: cloud services, connectivity to other video call endpoints, connectivity to third party software and more. The Wireless & Physical Network 1180 may serve as a local network adapter for the Docking System 640 or as a network bridge for the Video Call Aerial Unit 300 or both. The Secondary Data Repository 1190 may serve as an extension to the Data Repository 830 on the Video Call Aerial Unit 300 in cases additional resources are required, or it can optionally replace it so that the Video Call Aerial Unit 300 does not have it on board.

FIG. 12 is a flowchart diagram illustrating an example of the system process for hovering, maintaining and changing the position and orientation according to various monitoring inputs and according to various saved and learned scenarios. The Processing Unit 1270 may hold the different processing operations required while interacting with the Repository 830 through the Access Repository 1260 and sending the control commands through the Propulsion and Buoyancy Commands 1200. An example detailed flow occurs when a desired position and orientation of the Video Call Aerial Unit 300 has been achieved. The Hover Position and Orientation 1210 may send the Propulsion System 850 commands in order to continue and hold the same position, for example if optionally, a wind gust, pushed the system. The example Trackers and Monitors 1241, 1242, 1243, 1245 may use the different sensors to obtain current session related parameters and optionally changes in the parameters and may send the parameters to the Machine Learning Classifier 1250 which may decide if to initiate a desired Position Update Event 1220.

The Track Users' Position and Orientation 1241 may track one or multiple users' position, orientation and motion, with respect to the Video Call Aerial Unit 300, with respect to each other or any other reference point/object, for example but not limited to: where is the user located in the room, is the user sitting or standing, which direction is the user facing, is the user walking in a certain direction, is the local user also talking to another local user and more. The Track Users' Position and Orientation 1241 may be using the User Tracking Module 800 and/or the Relativity Evaluation Module 1050.

The Track User's Behavior 1242 may track one or multiple users' facial and body gestures for example but not limited to: Squinting of the eyes, turning the head aside, crossing the arms while standing, smiling, frowning, flinching, shaking of the head and more. The Track User's Behavior 1242 may be using the Facial/Body Evaluation Module 1030.

The Monitor Voice Commands 1243 may monitor the sounds inputs, identify words by one or more users, optionally convert the audio to analyzable digital text and identify potential verbal commands such as but not limited to: Come closer, move back, stop call, call Granny, turn up the volume, answer call, I can hear you, repetitive what statements and more. The Monitor voice commands 1243 may be using the Text Evaluation Module 1040.

The Monitor Voice Commands 1243 may also monitor the vocal expression of the user and may request the Machine Learning Process 1250 to classify whether the type of vocal expression may be an indicator for change in the desired position and orientation of the Video Call Aerial Unit 300. For example, identifying the user may be angry and therefore increase the distance for that user.

The Monitor and Map Environment 1244 may monitor the area around where the user or users may be and may check for changes and differences from the area already mapped in the system. For example, but not limited to: A chair has been moved, a door is closed, a new closet has been introduced, a first time in a new room, a window is open and more. The Monitor and Map Environment 1244 may be using the Environment Evaluation Module 1060, the Lighting Evaluation Module 1000, The Network Evaluation Module 1010, The Sound Evaluation Module 1020 and/or the Quality Evaluation Module 1021. The Machine Learning Process 1250 may also provide machine learning or other algorithm services to the example Trackers and Monitors 1241, 1242, 1243, 1244, 1245 to assist in identifying changes in each classification focus. An example method for an algorithm would be to build and maintain a 3D map created from the different sensors and to compare the current maps to the existing 3D map to identify potential changes. Each monitor may focus on specific aspects of the 3D map. Potential changes may also be compared to various 3D maps classified and stored in the Data Repository 830 in order to compare and decide to which stored map the current map is most similar to and therefore define the new scenario. The Machine Learning Process 1250 may process the collection of 3D maps into a complete scenario, for example: two people sitting around a table in front of each other and talking, or two kids sitting on the floor with toys in front of each other and playing, or one person washing dishes while talking, or more. For each of these pre-classified scenes the Machine Learning Process 1250 may have a desired position and orientation for the Video Call Aerial Unit 300.

The Machine Learning Classifier 1250 process may access the repository 1260 for, optionally, collecting more classified information or for updating the Repository 1260. Updates of the repository 1260 may occur as a result of identifying a new scenario or identifying a change to an existing scenario or other reasons. Once the Machine Learning Classifier 1250 has identified a new desired position and orientation is required, it may launch a Position Update Event, the system may Calculate a New Position 1230 optionally according to various inputs from the trackers, monitors and Access Repository 1260 and optionally using the Machine Learning Classifier 1250 process. The result calculation may then be passed to the Execute new Position 1240 which may translate the requested new position, orientation and path to optional commands to the Propulsion System 850 who may execute them accordingly.

The Monitor Remote Commands 1245 may monitor various commands sent by a remote user or users who may be on the video call or may be providing support and services to the video call. These commands can arrive from, for example but not limited to: Remote Voice commands, a remote mobile application, a remote desktop application, artificial intelligence commands and more. The Monitor Remote Commands 1245 may be using the Wireless Network 760 to receive the various external commands.

The remote commands which may lead the Video Call Aerial Unit 300 to a new desired position and orientation may also be used to update and create new scenarios to be classified and saved through the Access Repository 1260 to the Data Repository 830.

FIG. 13 is a flowchart diagram illustrating an example of the system process for a video call from one end point. A local user may view a video on the Projector/Display 710 of a remote user through the Display Video 1340. That local user may also hear audio from the remote user through the Sound Audio 1330 generated with the Speakers 730.

These example outputs may have been collected through the Receive Audio 1300 using the Microphones 720 and the Receive Video 1310, recorded through the Cameras 700, which may then be Streamed 1320 over a wireless or wired network. The system may operate both ways enabling a face to face video call between two users, local and remote over a large distance, including different locations in the world.

The invention claimed is:

1. A teleconferencing device comprising:
a propulsion system for flying the teleconferencing device having a surface, the propulsion system capable of making the teleconferencing device hover in place and change its position;
a projection unit capable of projecting images on at least a given part of the surface having a fixed position with respect to the projection unit;
at least one sensor capable of obtaining information enabling mapping an environment surrounding the teleconferencing device; and
a processing unit, configured to:
obtain information from the at least one sensor;
map the environment surrounding the teleconferencing device, using the obtained information, the environment including at least one user of the teleconferencing device;
track, within the mapped environment, a position and an orientation of at least one user of the teleconferencing device with respect to the teleconferencing device;
determine a desired position and orientation of the given part of the surface with respect to the at least one user based at least on the tracked position and orientation of the at least one user and on one or more session related parameters;
activate the propulsion system to fly the teleconferencing device to the determined desired position and orientation upon the given part of the surface not being positioned in the determined desired position and orientation;
receive a stream of images captured by a remote device; and
instruct the projection unit to project the received stream of images on the given part of the surface.

2. The teleconferencing device of claim 1, wherein the session related parameters include a measured signal strength or signal quality of a network connection through which the stream of images is received.

3. The teleconferencing device of claim 1, wherein the processing unit is further configured to estimate a viewing quality of the images viewed by the user, and wherein the session related parameters include the estimated viewing quality.

4. The teleconferencing device of claim 1, further comprising at least one speaker, and wherein the processing unit is further configured to:
receive a stream of sound captured by the remote device;
output the sound to the at least one user via the at least one speaker; and
estimate a sound quality of the sound received by the user; and
wherein the session related parameters include the estimated sound quality.

5. The teleconferencing device of claim 1, further comprising at least one microphone, and wherein the processing unit is further configured to acquire sound using the microphone and determine an ambient noise level by analyzing the acquired sound, and wherein the session related parameters include the determined ambient noise level.

6. The teleconferencing device of claim 1, wherein the processing unit is further configured to determine at least one of (a) amounts of light and (b) directions of light, in a respective plurality of positions in the environment surrounding the teleconferencing device, and wherein the session related parameters include the determined amounts of light or directions of light.

7. The teleconferencing device of claim 1, further comprising a mechanical attachment capable of attaching to a balloon for causing air buoyancy of the teleconferencing device, and wherein the surface is a surface of the balloon.

8. The teleconferencing device of claim 1, wherein the desired position and orientation is determined so that a clear line of sight is maintained between the given part of the surface and the at least one user.

9. The teleconferencing device of claim 1, wherein the processing unit is further configured to classify a use scenario of the teleconferencing device, utilizing the mapped environment and using a use scenario classifier; and wherein the desired position and orientation is determined using the use scenario.

10. The teleconferencing device of claim 9, wherein the use scenario classifier performs the classification based on one or more of: an activity performed by the user, a facial expression of the user, a voice volume of the user, a vocal expression of the user, a change in body movement rate of the user, a change in the user's body position, or a change in the user's body behavior.

11. A method of operating a teleconferencing device, the method comprising:
a propulsion system for flying the teleconferencing device having a surface, the propulsion system capable of making the teleconferencing device hover in place and change its position;
a projection unit capable of projecting images on at least a given part of the surface having a fixed position with respect to the projection unit;

at least one sensor capable of obtaining information enabling mapping an environment surrounding the teleconferencing device; and a processing unit, configured to:
obtaining information from at least one sensor of the teleconferencing device, the sensor capable of obtaining information enabling mapping an environment surrounding the teleconferencing device;

mapping the environment surrounding the teleconferencing device, using the obtained information, the environment including at least one user of the teleconferencing device;

tracking, within the mapped environment, a position and an orientation of at least one user of the teleconferencing device with respect to the teleconferencing device;

determining a desired position and orientation of the given part of a surface of the teleconferencing device with respect to the at least one user based at least on the tracked position and orientation of the at least one user and on one or more session related parameters;

activating a propulsion system of the teleconferencing device to fly the teleconferencing device to the determined desired position and orientation upon the given part of the surface not being positioned in the determined desired position and orientation, wherein the propulsion system is capable of making the teleconferencing device hover in place and change its position;

receiving a stream of images captured by a remote device; and instructing a projection unit, capable of projecting images on at least a given part of the surface having a fixed position with respect to the projection unit, to project the received stream of images on the given part of the surface.

12. The method of claim 11, wherein the session related parameters include a measured signal strength or signal quality of a network connection through which the stream of images is received.

13. The method of claim 11, further comprising estimating a viewing quality of the images viewed by the user, and wherein the session related parameters include the estimated viewing quality.

14. The method of claim 11, further comprising:
receiving a stream of sound captured by the remote device;
outputting the sound to the at least one user via at least one speaker of the teleconferencing device; and
estimating a sound quality of the sound received by the user; and
wherein the session related parameters include the estimated sound quality.

15. The method of claim 11, further comprising acquiring sound using a microphone of the teleconferencing device and determining an ambient noise level by analyzing the acquired sound, and wherein the session related parameters include the determined ambient noise level.

16. The method of claim 11, further comprising determining at least one of (a) amounts of light and (b) directions of light, in a respective plurality of positions in the environment surrounding the teleconferencing device, and wherein the session related parameters include the determined amounts of light or directions of light.

17. The method of claim 11, wherein the teleconferencing device further comprises a mechanical attachment capable of attaching it to a balloon for causing air buoyancy of the teleconferencing device, and wherein the surface is a surface of the balloon.

18. The method of claim 11, wherein the desired position and orientation is determined so that a clear line of sight is maintained between the given part of the surface and the at least one user.

19. The method of claim 11, further comprising classifying a use scenario of the teleconferencing device, utilizing the mapped environment and using a use scenario classifier; and wherein the desired position and orientation is determined using the use scenario.

20. The method of claim 19, wherein the use case classifier performs the classification based on one or more of: an activity performed by the user, a facial expression of the user, a voice volume of the user, a vocal expression of the user, a change in body movement rate of the user, a change in the user's body position, or a change in the user's body behavior.

* * * * *